US011719128B2

(12) United States Patent
Gauthier

(10) Patent No.: US 11,719,128 B2
(45) Date of Patent: Aug. 8, 2023

(54) LUBRICATION SYSTEM WITH ANTI-PRIMING FEATURE

(71) Applicant: Pratt & Whitney Canada Corp., Longueuil (CA)

(72) Inventor: Felix Gauthier, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 195 days.

(21) Appl. No.: 17/368,356

(22) Filed: Jul. 6, 2021

(65) Prior Publication Data

US 2023/0010133 A1 Jan. 12, 2023

(51) Int. Cl.
*F01D 25/20* (2006.01)
*F01M 5/02* (2006.01)
*F02C 7/06* (2006.01)

(52) U.S. Cl.
CPC .............. *F01D 25/20* (2013.01); *F01M 5/025* (2013.01); *F02C 7/06* (2013.01); *F01M 2005/028* (2013.01); *F05D 2220/323* (2013.01); *F05D 2260/98* (2013.01)

(58) Field of Classification Search
CPC .......... F01D 25/20; F01D 19/00; F01D 19/02; F01M 5/025; F01M 2005/028; F05D 2220/323; F05D 2260/98
See application file for complete search history.

(56) References Cited

U.S. PATENT DOCUMENTS

| | | | |
|---|---|---|---|
| 4,905,644 A * | 3/1990 | Masclet | B01D 37/046 210/132 |
| 5,018,601 A | 5/1991 | Waddington | |
| 5,555,722 A | 9/1996 | Mehr-Ayin | |
| 8,201,664 B2 | 6/2012 | Brouillet | |
| 2016/0305284 A1 | 10/2016 | Mastro | |
| 2018/0283211 A1* | 10/2018 | Parnin | F01D 19/00 |
| 2018/0283283 A1 | 10/2018 | Manoukian | |

OTHER PUBLICATIONS

EP search report for EP22183176.1 dated Dec. 13, 2022.

* cited by examiner

*Primary Examiner* — Michael R Månsen
*Assistant Examiner* — Mark K Buse
(74) *Attorney, Agent, or Firm* — Getz Balich LLC

(57) ABSTRACT

A lubrication system is provided for a turbine engine. This lubrication system includes a lubricant source, a pump, a first turbine engine component, a bypass circuit and a second turbine engine component. The lubricant source includes a source outlet. The pump includes a pump inlet and a pump outlet. The pump inlet is fluidly coupled with the source outlet. The first turbine engine component includes a first volume. The first volume is fluidly coupled with the pump outlet. The bypass circuit includes a bypass inlet and a bypass outlet. The bypass inlet is fluidly coupled with the pump outlet upstream of the first volume. The bypass outlet is fluidly coupled with the pump inlet downstream of the source outlet. The second turbine engine component includes a second volume. The second volume is fluidly coupled with the pump inlet downstream of the bypass outlet.

20 Claims, 7 Drawing Sheets

LUBRICATION SYSTEM WITH ANTI-PRIMING FEATURE

BACKGROUND OF THE DISCLOSURE

1. Technical Field

This disclosure relates generally to a turbine engine and, more particularly, to a lubrication system for the turbine engine.

2. Background Information

A turbine engine includes a lubrication system for providing lubricant to one or more components such as, for example, bearings and a gear box. Various types and configurations of lubrication systems are known in the art. While these known lubrications systems have various benefits, there is still room in the art for improvement. There is a need in the art therefore for an improved lubrication system for a turbine engine.

SUMMARY OF THE DISCLOSURE

According to an aspect of the present disclosure, a lubrication system is provided for a turbine engine. This lubrication system includes a lubricant source, a pump, a first turbine engine component, a bypass circuit and a second turbine engine component. The lubricant source includes a source outlet. The pump includes a pump inlet and a pump outlet. The pump inlet is fluidly coupled with the source outlet. The first turbine engine component includes a first volume. The first volume is fluidly coupled with the pump outlet. The bypass circuit includes a bypass inlet and a bypass outlet. The bypass inlet is fluidly coupled with the pump outlet upstream of the first volume. The bypass outlet is fluidly coupled with the pump inlet downstream of the source outlet. The second turbine engine component includes a second volume. The second volume is fluidly coupled with the pump inlet downstream of the bypass outlet.

According to another aspect of the present disclosure, another lubrication system is provided for a turbine engine. This lubrication system includes a lubricant source, a pump, a first turbine engine component and a second turbine engine component. The lubricant source includes a source outlet. The pump includes a pump inlet and a pump outlet. The pump inlet is fluidly coupled with and downstream of the source outlet. The first turbine engine component includes a first volume. The first volume is fluidly coupled with and downstream of the pump outlet. The second turbine engine component includes a second volume. The second volume is fluidly coupled with and between the source outlet and the pump inlet. The lubrication system is configured to direct air or an air/lubricant mixture from the second volume to the pump inlet during a first mode of operation. The lubrication system is configured to direct lubricant from the source outlet into the second volume during a second mode of operation.

According to still another aspect of the present disclosure, a method is provided for operating a lubrication system. During this method, lubricant is directed from a lubricant source and air or an air/lubricant mixture from an internal volume to a pump during a first mode of operation. The lubricant is directed from the lubricant source to the pump without any of the air from the internal volume during a second mode of operation. Control of the air from the internal volume to the pump during the second mode of operation is performed without use of a flow regulator between the internal volume and the pump.

The method may also include directing the lubricant from the lubricant source into the internal volume during the second mode of operation.

The method may also include directing the lubricant and the air or an air/lubricant mixture to a turbine engine component from the pump during the first mode of operation.

The method may also include preventing the lubricant from flowing into the internal volume during the second mode of operation.

The lubrication system may also include a bypass circuit, which may include a bypass inlet and a bypass outlet. The bypass inlet may be fluidly coupled with and downstream of the pump outlet, upstream of the first volume. The bypass outlet may be fluidly coupled with and upstream of the pump inlet, downstream of the source outlet.

The second volume may be operable to provide a source of air or an air/lubricant mixture to the pump to increase fluid pressure at the pump inlet and decrease fluid pressure at the pump outlet during cold start operation of the turbine engine.

The second volume may be directly fluidly coupled with the pump inlet through one or more lubricant passages.

The second turbine engine component may be configured to direct air or an air/lubricant mixture from the second volume to the pump inlet during a first mode of operation. The lubricant source may be configured to direct lubricant from the source outlet to the second volume during a second mode of operation.

The first mode of operation may be a cold start mode of operation.

The second mode of operation may be a post-cold start mode of operation.

The pump may be configured as a boost pump.

The bypass circuit may also include a flow regulator fluidly coupled inline between the bypass inlet and the bypass outlet.

The flow regulator may be configured as or otherwise include a fixed valve.

The pump may be a first pump. The lubricant source may include a second pump and a lubricant reservoir. The second pump may be fluidly coupled with and between the first pump and the lubricant reservoir.

The lubrication system may also include a flow restrictor fluidly coupled with and between the lubricant source and the pump inlet. The flow restrictor may be upstream of the bypass outlet.

The lubrication system may also include a third turbine engine component including a third volume. The third volume may be fluidly coupled with the source outlet in parallel with the pump inlet.

The second volume may be a lubricant scavenge cavity.

The lubrication system may also include a one-way valve fluidly coupled between the second volume and a fluid passage that fluidly couples the source outlet with the pump inlet. The one-way valve may be configured to permit air flow or an air/lubricant mixture flow from the second volume to the pump inlet.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
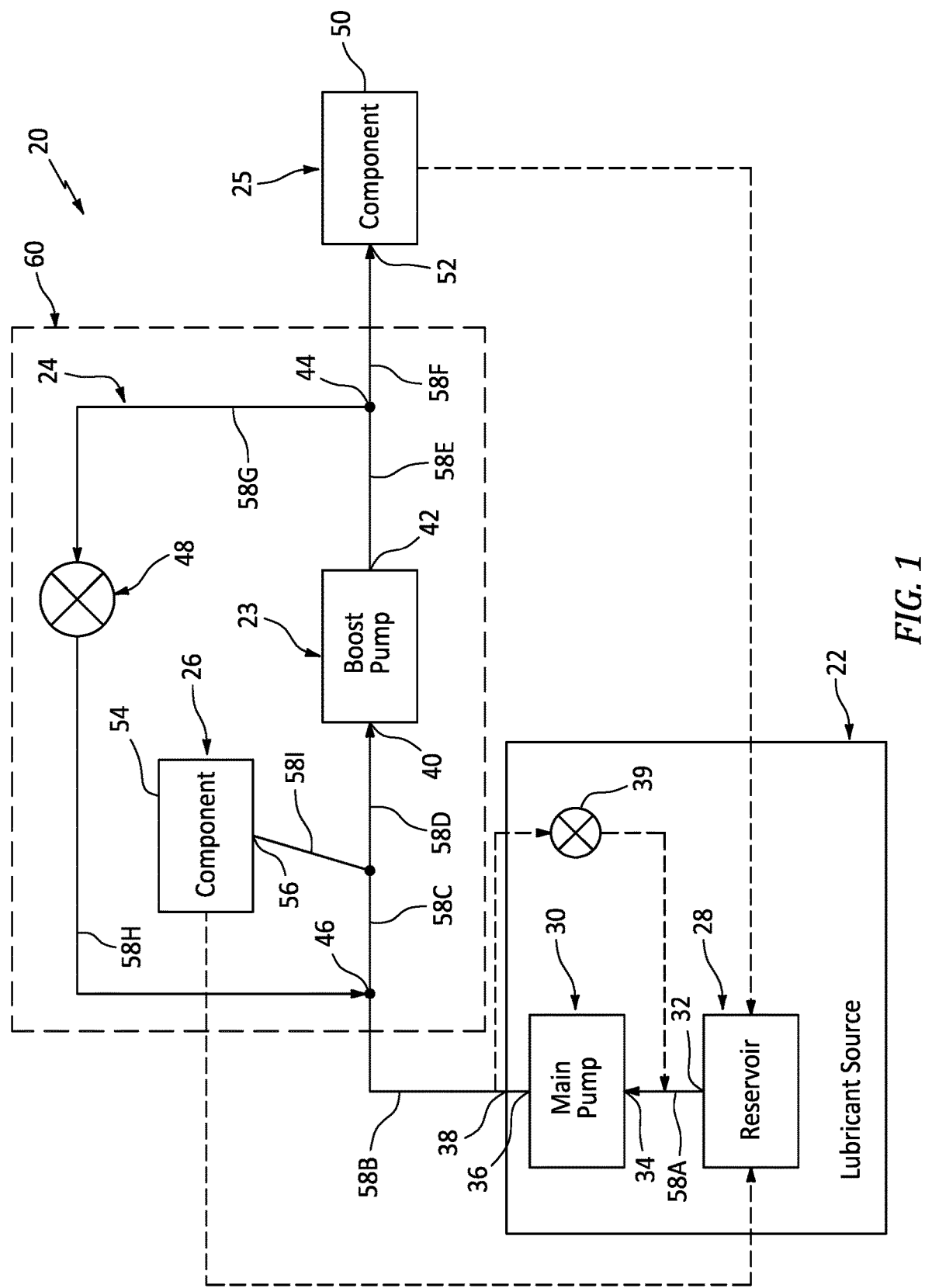
FIG. 1 is a schematic illustration of a lubrication system for a turbine engine.

FIG. 1 illustrates a lubrication system 20 for a turbine engine such as, but not limited to, a turbofan turbine engine, a turbojet turbine engine, a turboshaft turbine engine or a turboprop turbine engine. This lubrication system 20 includes a lubricant source 22, a lubricant boost pump 23, a lubricant bypass circuit 24 and one or more other components 25 and 26 of the turbine engine.

The lubricant source 22 is configured to provide lubricant (e.g., oil) to one or more other components of the lubrication system 20 during lubrication system operation. The lubricant source 22 may also be configured to store the lubricant during lubrication system operation and/or while the lubrication system 20 is non-operational (e.g., before and/or after lubrication system operation/turbine engine operation). The lubricant source 22 of FIG. 1, for example, includes a lubricant reservoir 28 and a lubricant main pump 30.

The lubricant reservoir 28 may be configured as or otherwise include a container; e.g., a tank, a cylinder, a pressure vessel, a bladder, etc. The lubricant reservoir 28 is configured to contain and hold a quantity of the lubricant. The lubricant reservoir 28 of FIG. 1 includes a reservoir outlet 32.

The lubricant main pump 30 may be configured as a primary lubricant pump for the lubrication system 20. This lubricant main pump 30 may be a gear pump or a centrifugal pump. The lubricant main pump 30 may be mechanically actuated through, for example, an accessory gearbox for the turbine engine. Alternatively, the lubricant main pump 30 may be electrically actuated through, for example, an electric motor. The present disclosure, however, is not limited to the foregoing exemplary lubricant main pump 30 configurations. The lubricant main pump 30 of FIG. 1 includes a main pump inlet 34 and a main pump outlet 36, which main pump outlet 36 may also be an outlet 38 for the lubricant source 22.

The main pump inlet 34 is fluidly coupled with and downstream of the reservoir outlet 32. With this arrangement, the lubricant main pump 30 is configured to direct (e.g., pump) the lubricant contained within the lubricant reservoir 28 and out of the lubricant source 22 through the source outlet 38 during lubrication system operation. In some embodiments, a fluid regulator 39 (e.g., a bypass valve) may be fluidly coupled with and between the outlet 38 (or fluid coupling 58B) and main pump inlet 34. This fluid regulator 39 may be configured to direct (e.g., divert) a portion of lubricant pumped out by the lubricant main pump 30 back to its inlet 34.

The lubricant boost pump 23 is configured to boost pressure of the lubricant received from the lubricant source 22, and then direct (e.g., pump) the now pressure boosted lubricant to the turbine engine component 25. The lubricant boost pump 23 may be a gear pump. The lubricant boost pump 23 may be mechanically actuated through, for example, the accessory gearbox for the turbine engine. Alternatively, the lubricant boost pump 23 may be electrically actuated through, for example, an electric motor. The present disclosure, however, is not limited to the foregoing exemplary lubricant boost pump configurations. The lubricant boost pump 23 of FIG. 1 includes a boost pump inlet 40 and a boost pump outlet 42.

The lubricant bypass circuit 24 is configured to provide a bypass during lubrication system operation. This lubricant bypass circuit 24 includes a bypass inlet 44 and a bypass outlet 46. The lubricant bypass circuit 24 of FIG. 1 may also include a bypass flow regulator 48 fluidly coupled with and between the bypass inlet 44 and the bypass outlet 46. This bypass flow regulator 48 is configured to facilitate a certain flowrate of fluid (e.g., the lubricant and/or air) through the lubricant bypass circuit 24.

The fluid flowrate through the lubricant bypass circuit 24 may be a fixed flowrate where, for example, the bypass flow regulator 48 is configured as a fixed valve. This fixed valve may be configured with an internal fixed metering orifice where the metering orifice does not change (e.g., increase or decrease) in size during lubrication system operation. The fixed valve may therefore be configured without any internal moving parts except for, for example, internal part(s) (e.g., an adjustable needle and/or an adjustable seat) which may be included for manually adjusting the size of the metering orifice. The present disclosure, however, is not limited to such an exemplary bypass flow regulator configuration. For example, in other embodiments, the fluid flowrate may alternatively be a variable flowrate where, for example, the bypass flow regulator 48 is configured as a variable valve. This variable valve may be selectively actuated during lubrication system operation to vary (e.g., increase, decrease) a size of an internal variable metering orifice therethrough based on one or more parameters such as, but not limited to, lubricant pressure, lubricant temperature, mode of lubrication system operation, mode of turbine engine operation, etc. While the variable valve may advantageously be actively adjusted to vary the fluid flowrate through the lubricant bypass circuit 24, the variable valve may also be subject to malfunction where its variable metering orifice may become stuck in a fully open position, a fully closed position or an intermediate position therebetween, unlike the fixed valve and its fixed metering orifice. The variable valve therefore may be paired with a (e.g., pressure or flow) sensor to detect such malfunction. By contrast, the fixed valve may be configured without such a sensor.

Each turbine engine component 25, 26 may be, may include or may be part of any component or structure of the turbine engine which may receive the lubricant. Each turbine engine component 25, 26, for example, may be configured as a component of the turbine engine which is lubricated by, cooled by, heated by, actuated by and/or otherwise received by the lubricant during lubrication system operation. The turbine engine component 25, for example, may be configured as or otherwise include a bearing (e.g., a rolling element bearing, a plane bearing, etc.), a gear system (e.g., for the accessory gearbox, or for a geartrain interconnecting turbine engine rotors), a heat exchanger and/or a hydraulic actuator. The turbine engine component 26 may be configured as component (e.g., a reservoir, a gutter, etc.) with a lubricant scavenge cavity. The present disclosure, however, is not limited to the foregoing exemplary turbine engine component configurations.

The turbine engine component 25 of FIG. 1 includes an internal first volume 50 and a first component inlet 52. The first volume 50 is fluidly coupled with the first component inlet 52. This first volume 50 may be an internal cavity, passage and/or space within the turbine engine component 25 which is adapted to receive the lubricant. For example, the first volume 50 may be or otherwise include a bearing compartment and/or interstices between bearing elements. In another example, the first volume 50 may be or otherwise include a gear system compartment and/or interstices between gear system elements (e.g., between gear teeth).

The turbine engine component 26 of FIG. 1 includes an internal second volume 54 and a (e.g., fixed) second component orifice 56. The second volume 54 is fluidly coupled with the second component orifice 56. This second volume 54 may be an internal cavity, passage and/or space within the turbine engine component 26 which is adapted to receive the lubricant, or provide air. The second component orifice 56 may be an inlet to or an outlet from the second volume 54 depending upon, for example, the mode of lubrication system operation as described below in further detail.

Referring still to FIG. 1, the boost pump inlet 40 is fluidly coupled with and downstream of the source outlet 38/the main pump outlet 36. The first component inlet 52 and, thus, the first volume 50 are fluidly coupled with and downstream of the boost pump outlet 42. The bypass inlet 44 is fluidly coupled with and downstream of the boost pump outlet 42, upstream of the first component inlet 52 and, thus, the first volume 50. The bypass outlet 46 is fluidly coupled with and upstream of the boost pump inlet 40, downstream of the source outlet 38. The second component orifice 56 and, thus, the second volume 54 is fluidly coupled with and upstream of the boost pump inlet 40, downstream of the bypass outlet 46.

The fluid couplings 58A-I (generally referred to as "58") between the various lubrication system components described above may be made by one or more fluid conduits; e.g., pipes, hoses, etc. The fluid couplings 58 may also or alternatively be made by one or more internal volumes (e.g., passages, cavities, spaces, etc.) within and/or through one or more other components of the turbine engine. Alternatively, any one or more of the fluid couplings 58 may be made directly without, for example, any intervening elements.

During lubrication system operation, the lubricant source 22 directs (e.g., pumps) the lubricant to a lubricant boost system 60, which lubricant boost system 60 includes (at least or only) the lubrication system elements 23, 24 and 26. In particular, the lubricant source 22 directs the lubricant to the lubricant boost pump 23. The lubricant boost pump 23 boosts (e.g., increases) the pressure of the lubricant. The lubricant boost pump 23 directs (e.g., pumps) the pressure boosted lubricant to the turbine engine component 25 and its internal volume 54. However, to check and/or alleviate pressure exerted by the pressure boosted lubricant on the turbine engine component 25 and its internal volume 54, the lubricant bypass circuit 24 bleeds off some of the pressure boosted lubricant from the fluid coupling 58E. The lubricant bypass circuit 24 directs (e.g., flows) the bled lubricant back towards the boost pump inlet 40. In this manner, during normal lubrication system operation, the lubricant received by the turbine engine component 25 may not be overpressurized by the lubricant boost pump 23.

The lubricant bypass circuit 24 may be designed (e.g., optimized) for use during the normal lubrication system operation when, for example, the lubricant is at its normal working temperature and pressure; e.g., the lubricant temperature and pressure while the turbine engine and an associated aircraft are at cruise. During such normal lubrication system operation, the lubricant within the lubrication system 20 is relatively hot and, thus, may have a relatively low viscosity. By contrast, during cold start operation, the lubricant within the lubrication system 20 may be relatively cold and, thus, may have a relatively high viscosity; e.g., the lubricant may be relatively viscous. As a result of this relatively high viscosity, the pressure of the pressure boosted lubricant output by the lubricant boost pump 23 may be higher than during normal lubrication system operation. Under such conditions, the lubricant bypass circuit 24 may not bleed off enough of the pressure boosted lubricant upstream of the turbine engine component 25.

Figure 2:
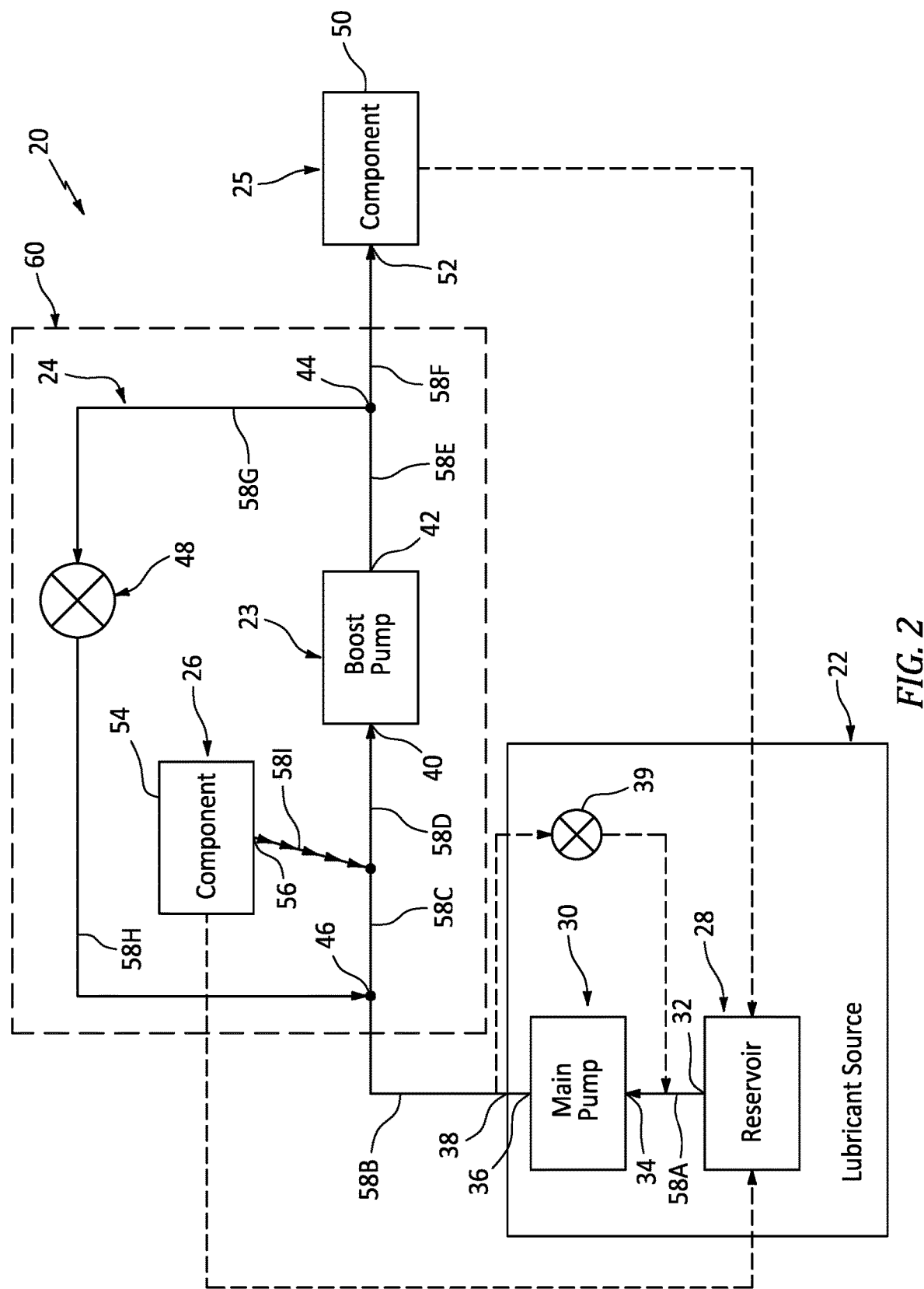
FIG. 2 is a schematic illustration of the lubrication system during a first mode of operation.

To account for viscosity changes in the lubricant during lubrication system operation, the lubrication system 20 includes the turbine engine component 26 and its second volume 54 in the lubricant boost system 60. For example referring to FIG. 2, during a first (e.g., a cold start) mode of operation where the lubricant has a relatively high viscosity. The lubricant boost pump 23 displaced volume flow may create local low pressure in the fluid couplings 58B-D. This relatively low pressure at the boost pump inlet 40 can reach a critical condition (e.g., pump cavitation) where the pump (e.g., only) receives the lubricant and the flow of the lubricant is relatively viscous. Suction from the lubricant boost pump 23 may therefore siphon (e.g., vacuum) air out or an air/lubricant mixture out of the turbine engine component 26 and its second volume 54 (or another relatively low pressure cavity with a pressure higher than the pressure in the fluid coupling 58C) through the second component orifice 56; e.g., an outlet. This air or the air/lubricant mixture may mix with the lubricant received from the lubricant source 22 upstream of the lubricant boost pump 23. The addition of the air or the air/lubricant mixture into the lubricant may prevent the lubricant boost pump 23 from fully priming and thereby reduce the pressure of the fluid (e.g., the air-lubricant mixture) output from the lubricant boost pump 23 since the gaseous air is very compressible as compared to the liquid lubricant. The addition of the air or the air/lubricant mixture into the lubricant may reduce the pressure of the pressure boosted lubricant received by the turbine engine component 25 and its first volume 50. The second component orifice 56 may thereby provide an anti-priming feature for the lubricant boost pump 23 during the first mode of operation. Also, the introduction of the air or the air/lubricant mixture into the boost pump circuit may prevent pressure at the boost pump inlet 40 from reaching a critical low value and, thus, may prevent pump cavitation. The pressure at the boost pump inlet 40 may be on the order of magnitude of the pressure within the source volume 54 and above critical value. In addition, referring briefly to FIG. 6, a lubricant restrictor 64 can enhance this effect. This lubricant restrictor 64 may balance the flow at an outlet of the boost system (e.g., in the fluid coupling 58F) within the operating range of the system (from low to high power). This may prevent sending too much lubricant at low power since it is design to provide sufficient lubricant flow at high power. It is a balance between the pump speed variations relative to the pressure behavior of the volume 50.

Figure 3:
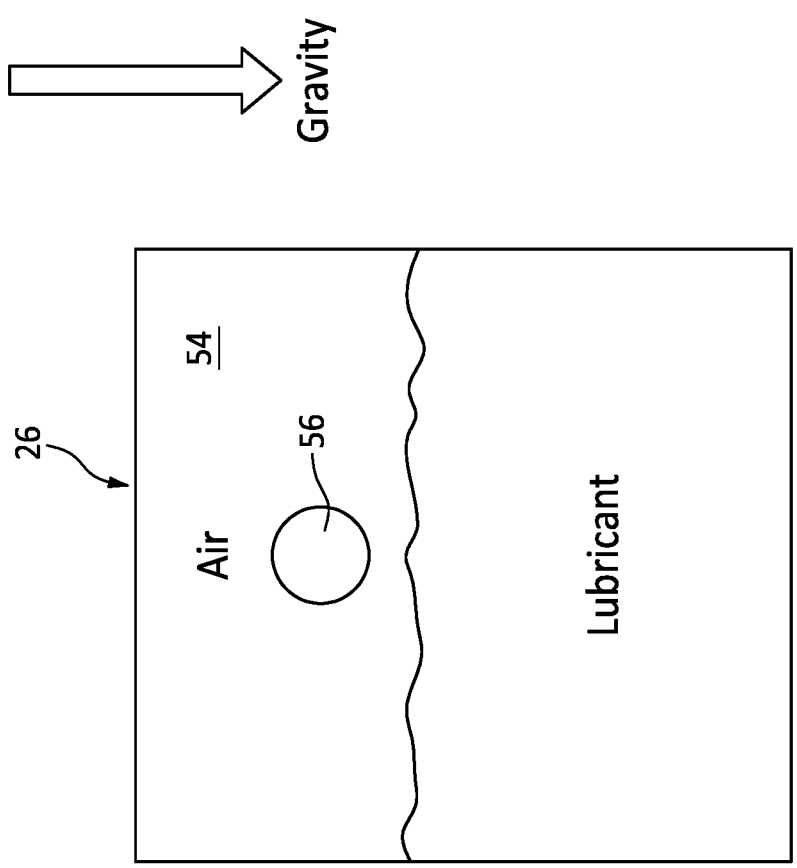
FIG. 3 is a schematic illustration of a turbine engine component with an internal volume partially filled with lubricant.

As described above, the second volume 54 may be configured as the lubricant scavenge cavity or another volume that may receive the lubricant. Referring to FIG. 3, with such a configuration, any of the lubricant contained within the second volume 54 is vertically (relative to gravity) below a level of the second component orifice 56 during the first mode of operation. Thus, the air or the air/lubricant mixture is provided to the lubricant boost pump 23 of FIG. 2 during the first mode of operation, not additional lubricant.

Figure 4:
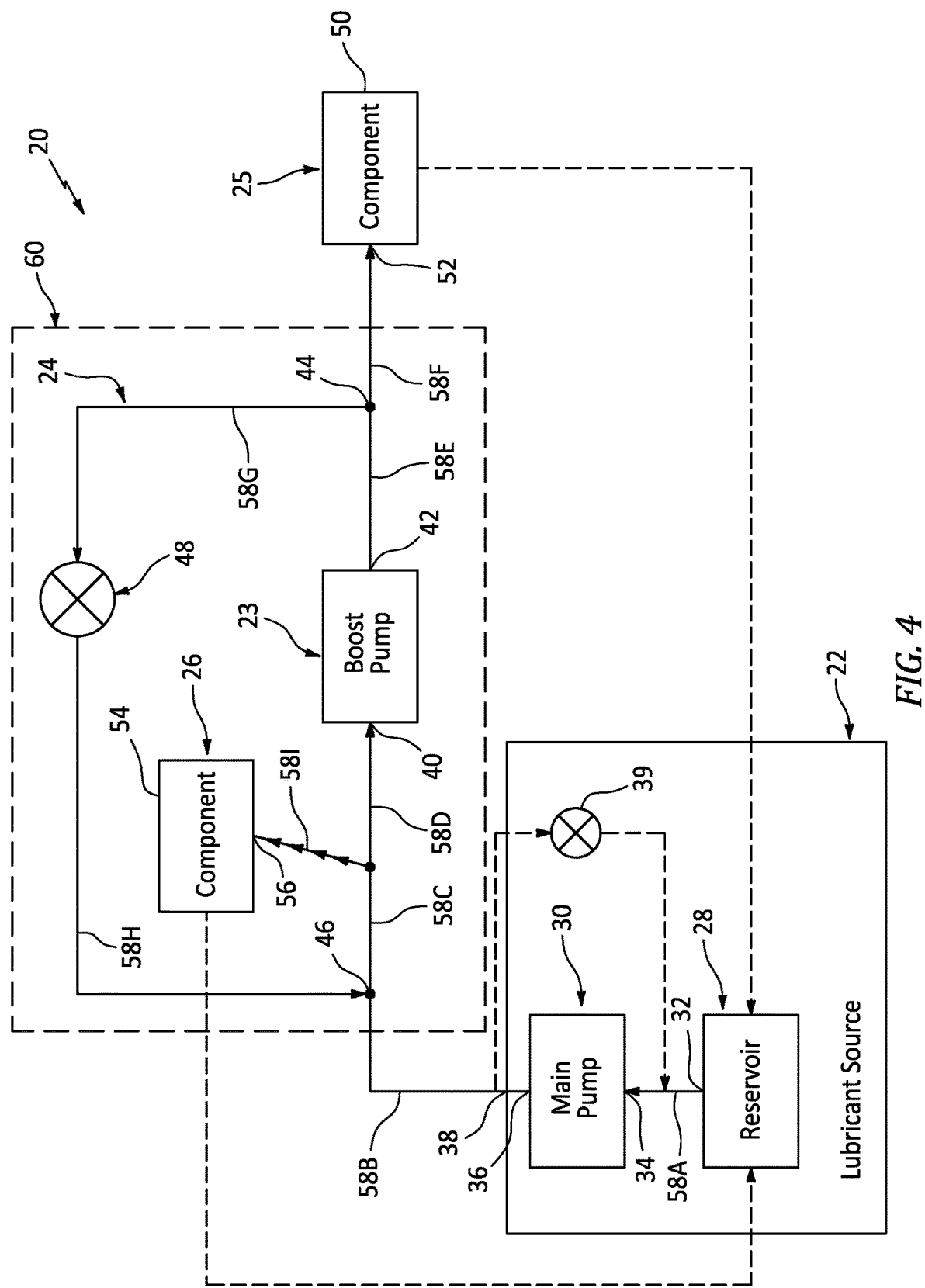
FIG. 4 is a schematic illustration of the lubrication system during a second mode of operation.

Referring to FIG. 4, during a second (e.g., a post cold start, normal) mode of operation where the lubricant has a relatively low viscosity, the lubricant directed by the lubricant source 22 to the lubricant boost pump 23 may have a relatively high pressure. The lubricant output by the lubricant source 22 may therefore flow to both the lubricant boost pump 23 and to the second turbine engine component 26 and its second volume 54 through the fluid coupling 58I. Thus, during this second mode of operation, the lubricant boost pump 23 may no longer receive air or air/lubricant mixture from the turbine engine component 26 and its second volume 54 and, thus, may direct (e.g., only) the lubricant to the turbine engine component 25 and the lubricant bypass circuit 24. The lubricant directed into the second volume 54 through the second component orifice 56 (e.g., an inlet or a jet) may be collected and, for example, returned to the lubricant source 22 and its lubricant reservoir 28. Thus, during the second mode of operation, the inclusion of the turbine engine component 26 within the lubricant boost system 60 may have little or no impact on lubricant boost system operation.

With the foregoing configuration, the lubricant boost pump 23 may receive the air-lubricant mixture during the first mode of operation and the lubricant (e.g., without the air) during the second mode of operation without, for example, arranging a flow regulator (e.g., a variable valve) with the second component orifice 56; e.g., between the second component orifice 56 and the boost pump inlet 40. In other words, inclusion of the turbine engine component 26 and its second volume 54 in the lubricant boost system 60 may facilitate anti-priming of the lubricant boost pump 23 without including an anti-priming valve. Complexity and moving parts of the lubricant boost system 60 may thereby be reduced.

A size of the second component orifice 56 is selected to maximize anti-priming efficiency during the first mode of operation. The size of the second component orifice 56 is also selected to minimize lubricant leakage into the second volume 54 during the second mode of operation.

Figure 5:
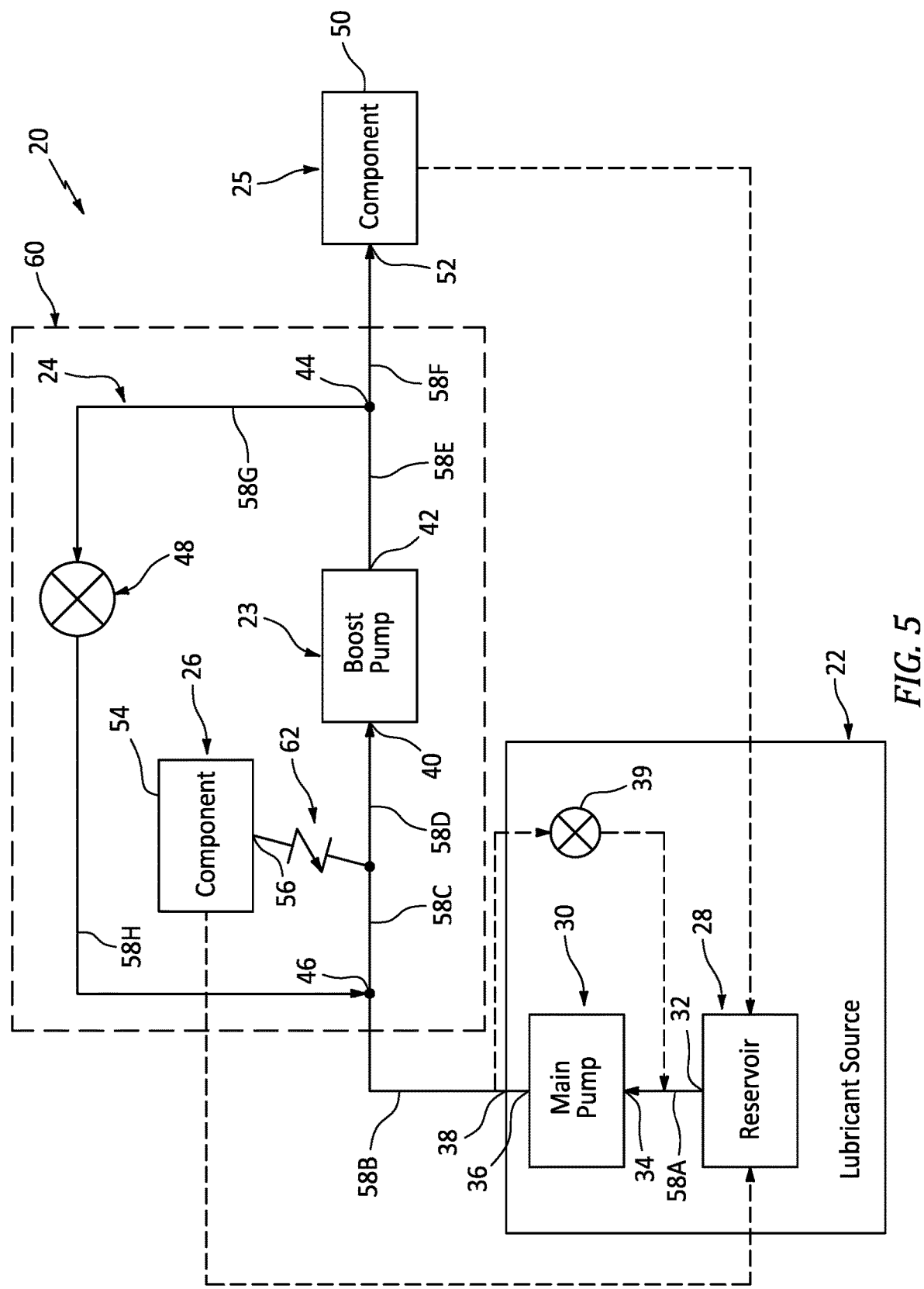
FIG. 5 is a schematic illustration of the lubrication system configured with a one-way valve.

In some embodiments, referring to FIG. 5, the lubrication system 20 and its lubricant boost system 60 may include a one-way valve 62; e.g., a check valve. The one-way valve 62 of FIG. 5 is fluidly coupled between the second volume 54 and its second component orifice 56 and the fluid coupling 58C, D (e.g., a fluid passage) that fluidly couples the source outlet 38 with the boost pump inlet 40. This one-way valve 62 may be configured to permit fluid flow in a first direction out of the second volume 54, but reduce or prevent fluid flow in a second (opposite) direction into the second volume 54. The one-way valve 62 may thereby facilitate provision of the air or the air/lubricant mixture to the lubricant boost pump 23 during the first mode of operation, but reduce or prevent lubricant leakage into the second volume 54 during the second mode of operation. In such embodiments, the size of the second component orifice 56 may be increased to further maximize anti-priming efficiency during the first mode of operation.

Figure 6:
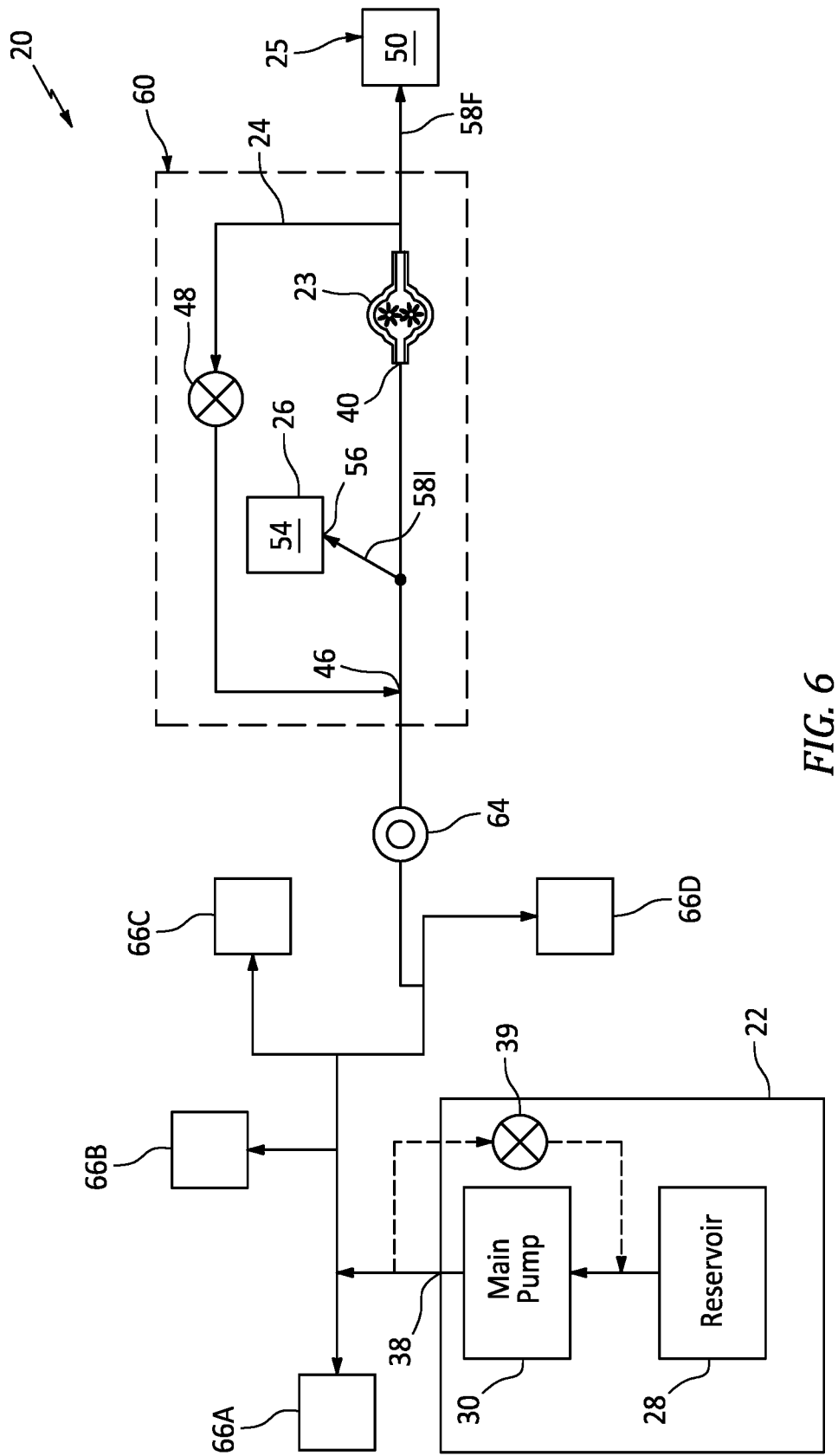
FIG. 6 is a schematic illustration of the lubrication system configured with a flow restrictor and additional turbine engine components.

In some embodiments, referring to FIG. 6, the lubrication system 20 may include the lubricant restrictor 64; e.g., a metering valve or control orifice. The lubricant restrictor 64 of FIG. 6 is fluidly coupled between the source outlet 38 and the boost pump inlet 40, upstream of the bypass outlet 46. The combination of the pump 23 design, the line 58 sizes, the use of the lubricant restrictor 64 (e.g., an orifice) and a high by-pass ratio (via the bypass flow regulator 48) may reduce (e.g., minimize) the boost pressure in cold start operation. In addition, the suction of the air or air/lubricant mixture may further reduce the pressure downstream of the boost pump 23. This happen when pressure in fluid coupling 58C is below the pressure of the second volume 54. Furthermore, this prevents pressure from getting too low at the pump inlet 40 and hence, prevent a critical condition such as cavitation at the boost pump 23.

In some embodiments, the lubrication system 20 may include one or more additional turbine engine components 66A-D (generally referred to as "66"). Each of these turbine engine components 66 may include a respective internal volume configured to receive the lubricant. These turbine engine components 66 and their internal volumes, however, may be arranged in parallel with and/or upstream of the lubricant boost system 60. The turbine engine components 66 and their internal volumes may thereby receive the lubricant from the lubricant source 22, not from the lubricant boost pump 23. Sub-system pressures associated with the turbine engine components 66, for example, may be regulated with a pressure regulating valve (not shown for simplicity).

Figure 7:
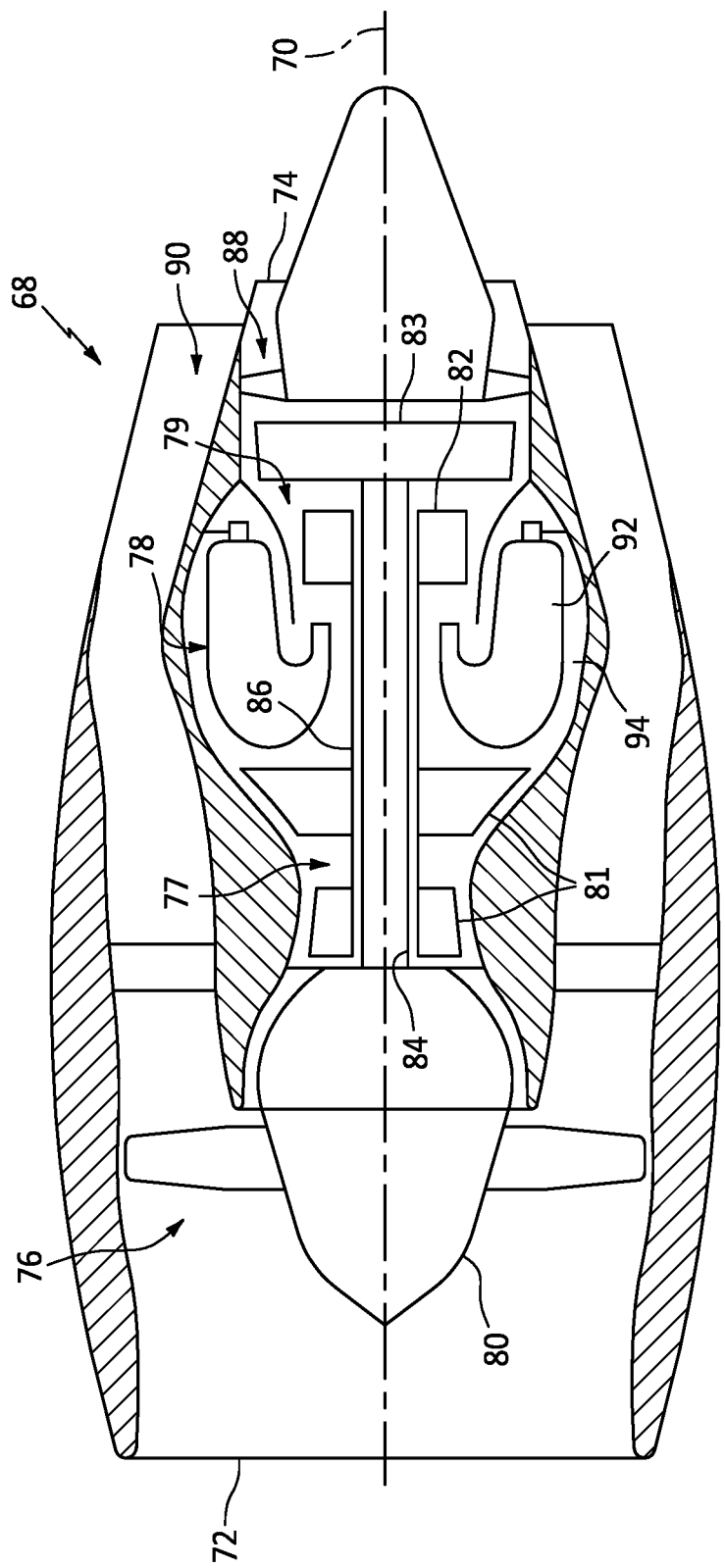
FIG. 7 is a schematic illustration of a turbine engine with which the lubrication system may be configured.

FIG. 7 illustrates an example of the turbine engine with which the lubrication system 20 may be configured. This turbine engine is configured as a turbofan gas turbine engine 68. The turbine engine 68 of FIG. 7 extends along a centerline 70 of the engine 68 between an upstream airflow inlet 72 and a downstream airflow exhaust 74. The turbine engine 68 includes a fan section 76, a compressor section 77, a combustor section 78 and a turbine section 79.

The fan section 76 includes a fan rotor 80. The compressor section 77 includes a compressor rotor 81. The turbine section 79 includes a high pressure turbine (HPT) rotor 82 and a low pressure turbine (LPT) rotor 83, where the LPT rotor 83 is configured as a power turbine rotor. Each of these rotors 80-83 includes a plurality of rotor blades arranged circumferentially around and connected to one or more respective rotor disks.

The fan rotor 80 is connected to the LPT rotor 83 through a low speed shaft 84. The compressor rotor 81 is connected to the HPT rotor 82 through a high speed shaft 86. The low speed shaft 84 extends through a bore of the high speed shaft 86 between and connects the fan rotor 80 and the LPT rotor 83. The low speed shaft 84 and the high speed shaft 86 are rotatably supported by one or more bearings (not shown), one or more of which bearings may be serviced by the lubrication system 20.

During operation, air enters the turbine engine through the airflow inlet 72. This air is directed through the fan section 76 and into a core flowpath 88 and a bypass flowpath 90. The core flowpath 88 extends sequentially through the engine sections 77-79; e.g., an engine core. The air within the core flowpath 88 may be referred to as "core air". The bypass flowpath 90 extends through a bypass duct, which bypasses the engine core. The air within the bypass flowpath 90 may be referred to as "bypass air".

The core air is compressed by the compressor rotor 81 and directed into an annular combustion chamber 92 of an annular combustor 94 in the combustor section 78. Fuel is injected into the combustion chamber 92 and mixed with the compressed core air to provide a fuel-air mixture. This fuel-air mixture is ignited and combustion products thereof flow through and sequentially cause the HPT rotor 82 and the LPT rotor 83 to rotate. The rotation of the HPT rotor 82 drives rotation of the compressor rotor 81 and, thus, compression of air received from an inlet into the core flowpath 88. The rotation of the LPT rotor 83 drives rotation of the fan rotor 80, which propels bypass air through and out of the bypass flowpath 90. The propulsion of the bypass air may account for a significant portion (e.g., a majority) of thrust generated by the turbine engine.

The lubrication system 20 may be included in various turbine engines other than the ones described above. The lubrication system 20, for example, may be included in a geared turbine engine where a gear train connects one or more shafts to one or more rotors in a fan section, a compressor section and/or any other engine section. Alternatively, the lubrication system 20 may be included in a turbine engine configured without a gear train; e.g., a direct drive turbine engine. The lubrication system 20 may be included in a geared or non-geared turbine engine configured with a single spool, with two spools (e.g., see FIG. 7), or with more than two spools. The turbine engine may be configured as a turbofan engine, a turbojet engine, a propfan engine, a pusher fan engine, an auxiliary power unit (APU) or any other type of turbine engine. The present disclosure therefore is not limited to any particular types or configurations of turbine engines. In addition, while the turbine engine is described above for use in an aircraft application, the present disclosure is not limited to such aircraft applications. For example, the turbine engine may alternatively be configured as an industrial gas turbine engine, for example, for a land based power plant.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A lubrication system for a turbine engine, comprising:
a lubricant source including a source outlet;
a pump including a pump inlet and a pump outlet, the pump inlet fluidly coupled with the source outlet;
a first turbine engine component including a first volume, the first volume fluidly coupled with the pump outlet;
a bypass circuit including a bypass inlet and a bypass outlet, the bypass inlet fluidly coupled with the pump outlet upstream of the first volume, and the bypass outlet fluidly coupled with the pump inlet downstream of the source outlet; and
a second turbine engine component including a second volume, the second volume fluidly coupled with the pump inlet downstream of the bypass outlet.

2. The lubrication system of claim 1, wherein the second volume is operable to provide a source of air or an air/lubricant mixture to the pump to increase fluid pressure at the pump inlet and decrease fluid pressure at the pump outlet during cold start operation of the turbine engine.

3. The lubrication system of claim 1, wherein the second volume is directly fluidly coupled with the pump inlet through one or more lubricant passages.

4. The lubrication system of claim 1, wherein
the second turbine engine component is configured to direct air or an air/lubricant mixture from the second volume to the pump inlet during a first mode of operation; and
the lubricant source is configured to direct lubricant from the source outlet to the second volume during a second mode of operation.

5. The lubrication system of claim 4, wherein the first mode of operation is a cold start mode of operation.

6. The lubrication system of claim 5, wherein the second mode of operation is a post-cold start mode of operation.

7. The lubrication system of claim 1, wherein the pump is configured as a boost pump.

8. The lubrication system of claim 1, wherein the bypass circuit further includes a flow regulator fluidly coupled inline between the bypass inlet and the bypass outlet.

9. The lubrication system of claim 8, wherein the flow regulator comprises a fixed valve.

10. The lubrication system of claim 1, wherein
the pump comprises a first pump;
the lubricant source comprises a second pump and a lubricant reservoir; and
the second pump is fluidly coupled with and between the first pump and the lubricant reservoir.

11. The lubrication system of claim 1, further comprising a flow restrictor fluidly coupled with and between the lubricant source and the pump inlet, the flow restrictor upstream of the bypass outlet.

12. The lubrication system of claim 1, further comprising a third turbine engine component including a third volume, the third volume fluidly coupled with the source outlet in parallel with the pump inlet.

13. The lubrication system of claim 1, wherein the second volume comprises a lubricant scavenge cavity.

14. The lubrication system of claim 1, further comprising a one-way valve fluidly coupled between the second volume and a fluid passage that fluidly couples the source outlet with the pump inlet, the one-way valve configured to permit air flow or an air/lubricant mixture flow from the second volume to the pump inlet.

15. A lubrication system for a turbine engine, comprising:
a lubricant source including a source outlet;
a pump including a pump inlet and a pump outlet, the pump inlet fluidly coupled with and downstream of the source outlet;
a first turbine engine component including a first volume, the first volume fluidly coupled with and downstream of the pump outlet; and
a second turbine engine component including a second volume, the second volume fluidly coupled with and between the source outlet and the pump inlet;
wherein the lubrication system is configured to direct air or an air/lubricant mixture from the second volume to the pump inlet during a first mode of operation, and the lubrication system is configured to direct lubricant from the source outlet into the second volume during a second mode of operation.

16. The lubrication system of claim 15, further comprising:
a bypass circuit including a bypass inlet and a bypass outlet;
the bypass inlet fluidly coupled with and downstream of the pump outlet, upstream of the first volume; and the bypass outlet fluidly coupled with and upstream of the pump inlet, downstream of the source outlet.

17. A method for operating a lubrication system, comprising:

during a first mode of operation, directing lubricant from a lubricant source and air or an air/lubricant mixture from an internal volume to a pump; and during a second mode of operation, directing the lubricant from the lubricant source to the pump without any of the air from the internal volume;

wherein control of the air from the internal volume to the pump during the second mode of operation is performed without use of a flow regulator between the internal volume and the pump.

18. The method of claim 17, further comprising directing the lubricant from the lubricant source into the internal volume during the second mode of operation.

19. The method of claim 17, further comprising directing the lubricant and the air or an air/lubricant mixture to a turbine engine component from the pump during the first mode of operation.

20. The method of claim 17, further comprising preventing the lubricant from flowing into the internal volume during the second mode of operation.

* * * * *